Figure 1:
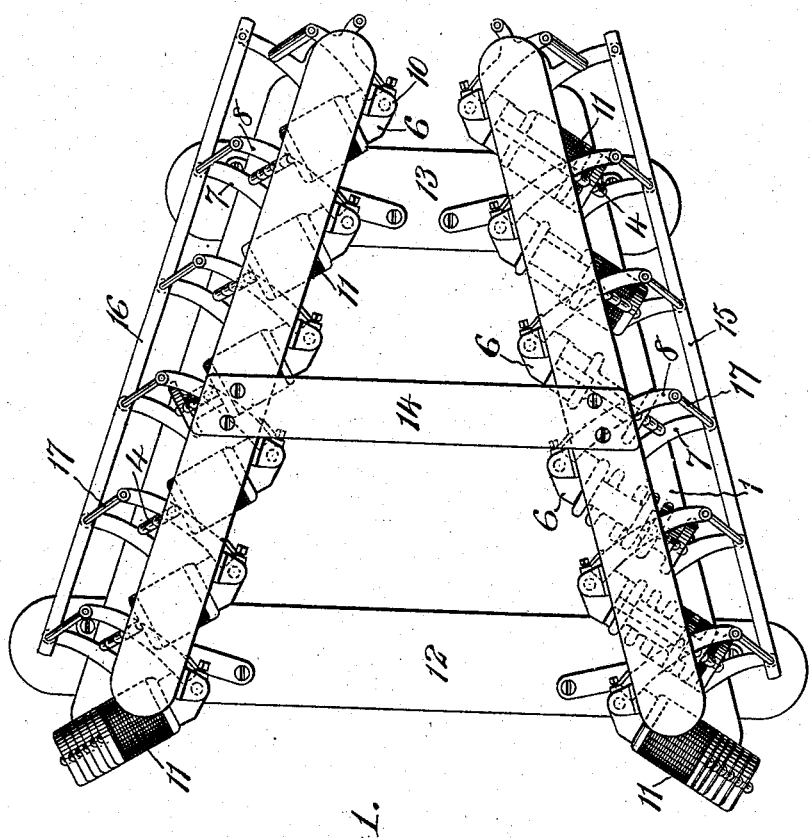

I. E. PALMER.
CREEL.
APPLICATION FILED APR. 17, 1906.

911,904.

Patented Feb. 9, 1909.
2 SHEETS—SHEET 1.

Witnesses:-
F. George Barry.
J Henry Thieme.

Inventor:-
Isaac E. Palmer
By Brown Ward
his Attorneys

I. E. PALMER.
CREEL.
APPLICATION FILED APR. 17, 1906.
911,904.
Patented Feb. 9, 1909.
2 SHEETS—SHEET 2.
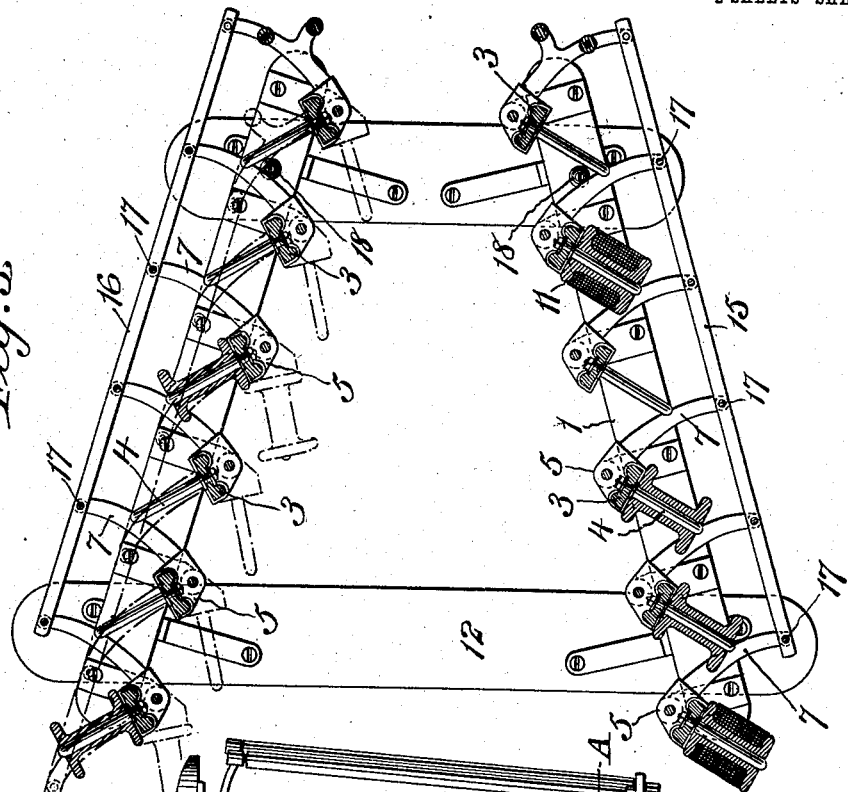
Witnesses:
F. George Barry,
J. Henry Thieme.
Inventor:
Isaac E. Palmer
By Brown & Seward
his Attorneys

UNITED STATES PATENT OFFICE.

ISAAC E. PALMER, OF MIDDLETOWN, CONNECTICUT.

CREEL.

No. 911,904.　　　Specification of Letters Patent.　　　Patented Feb. 9, 1909.

Application filed April 17, 1906. Serial No. 312,076.

*To all whom it may concern:*

Be it known that I, ISAAC E. PALMER, a citizen of the United States, and resident of Middletown, in the county of Middlesex and State of Connecticut, have invented a new and useful Improvement in Creels, of which the following is a specification.

My invention relates to creels with the object in view of providing simple and effective means for doffing the spools without interfering with threads leading from spools in operation.

A practical embodiment of my invention is represented in the accompanying drawings, in which—

Figure 1 is a top plan view of a creel composed of two racks, Fig. 2 is a side elevation of the same, and Fig. 3 is a horizontal section of the same in the plane of the line A—A of Fig. 2.

The racks are quite similar in construction, each consisting of a base 1 and top 2, between which a series of spindle bars are arranged as follows:—In the present instance, each rack carries six spindle bars denoted by 3. Each of these spindle bars is provided with a series of spindles 4. In the present instance, each bar is shown as provided with six spindles projecting laterally therefrom. The spindle bars are set at their upper and lower ends in socket pieces 5 and 6, the said socket pieces being provided with arms projecting outwardly therefrom, the socket piece 5 at the bottom being provided with an arm 7 and the socket piece 6 at the top with an arm 8. In like manner each of the socket pieces at the opposite ends of each of the spindle bars 3 is provided with arms projecting outwardly in a manner quite similar to the arms 7 and 8.

The socket pieces 5 and 6 are pivotally secured in bearing pieces 9 and 10, one at the bottom and one at the top, which bearing pieces are made fast to the upper face of the base 1 and the lower face of the top 2. This arrangement permits the spindle bar with its spools 11 thereon to be turned inwardly or outwardly.

The base 1 and the base of the companion rack are supported upon suitable cross pieces 12 and 13 and the top 2 and the top of the companion rack are held spaced the proper distance apart by means of a cross piece 14. In setting up the racks with their spindle bars, the racks are preferably set their bases and the spindle bars are set at a slight angle to the plane of the base. The arm 7 and the corresponding arms extending from the base socket pieces 5 of the rack may be connected at their outer ends to a continuous bar 15. In like manner the arms leading from the base socket pieces of the companion rack are pivotally connected to a continuous bar 16. The bars 15 and 16 are used for simultaneously swinging the several spindle bars with spools thereon from the position shown in full lines, Fig. 3, to the position shown in dotted lines.

The pivotal connection between the arm 7 and the corresponding arms of the other socket pieces with the bar 15 is made by rods 17 which extend from the outer ends of the arms at the base socket pieces to the outer ends of the arms from the top sockets and these rods 17 serve as guides over which the threads from the spools 11 lead in passing to the warp beam. This is true of each of the racks and when the spindle beams are swung into the position shown in dotted lines in the upper half of Fig. 3, throwing the spools into position to be readily manipulated by an operator standing between the two racks, the threads will still lead over these guides and the tension will be maintained on all of the threads while a spool is being doffed and another put in place. Furthermore, when swung into this position shown in dotted lines, the operator will no longer be required in removing an empty spool and putting a filled spool in its place to pass the empty spool and filled spool between the threads leading from spools in operation but will have the spool presented to him within convenient reach for manipulation without interfering in any manner with the threads leading from adjacent spools. He will also have within his reach the spools from both racks and without necessitating his passing around to the outside of each of the racks in the event spools need attention on both racks at about the same time.

To limit the swinging movement of the spindle bars I provide a stop 18 on the base piece 1 and a similar stop on the base piece of the corresponding rack which will, when the bars are turned outwardly, as shown in the lower half of Fig. 3, engage one of the arms 7 and limit the outward swinging movement of the bars and when the bars are turned inwardly, as shown in the dotted lines, upper half of Fig. 3, will engage an adjacent arm and limit the inward swinging movement.

It is obvious that the bar for connecting the arms leading from the sockets might connect the upper arms instead of the lower if so desired and also that the spindle bars might be turned inwardly and outwardly independently of one another by omitting the connecting bar entirely if so desired.

What I claim is:—

1. A creel comprising racks set at an angle to each other, spool carrying bars pivotally secured to the racks and provided with spool spindles projecting laterally therefrom with their free ends unobstructed and means for swinging a spool carrying bar from a position with the free ends of the spool spindles directed outwardly from the rack to a position where the free ends of the spool spindles are directed inwardly from the rack whereby the spools may be doffed from the outside of the rack by sliding them endwise off the end of a spindle or from the inside of the rack by sliding them endwise off the end of a spindle.

2. A creel comprising racks set at an angle to each other, spool carrying bars pivotally secured to the racks and provided with spool spindles projecting laterally therefrom with their free ends unobstructed, means for swinging a spool carrying bar from a position for holding the free ends of the spindles directed outwardly to a position for holding the spool spindles with their free ends directed inwardly and guides arranged to swing with their pivoted spool carrying bars for maintaining the threads at the proper angle to the spools on that bar in whatever position the bar may be rocked.

3. A creel comprising racks set at an angle to each other, spool carrying bars pivotally secured to the racks and provided with spool spindles projecting laterally therefrom with their free ends unobstructed, means for rocking the spool carrying bars from positions with the free ends of their spool spindles directed outwardly to positions with the free ends of the spool spindles directed inwardly and guides extending parallel with the pivoted bars and arranged to rock with the bars for maintaining the threads leading from the spools on a bar at the proper angle to the spools whatever the rocking adjustment of the bar may be.

In testimony, that I claim the foregoing as my invention, I have signed my name in presence of two witnesses, this 14th day of April A. D. 1906.

ISAAC E. PALMER.

Witnesses:
CHAS. M. SAUER,
PAUL S. CARRIER.